(12) United States Patent  (10) Patent No.: US 9,640,957 B2
Inao et al.  (45) Date of Patent: May 2, 2017

(54) WIRE HARNESS EXTERIOR MEMBER AND WIRE HARNESS

(71) Applicant: YAZAKI CORPORATION, Tokyo (JP)

(72) Inventors: Shinichi Inao, Shizuoka (JP); Hideomi Adachi, Shizuoka (JP); Takeshi Ogue, Shizuoka (JP); Tatsuya Oga, Shizuoka (JP); Hiroyuki Yoshida, Shizuoka (JP); Masaaki Suguro, Shizuoka (JP); Yoshiaki Ozaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/685,972

(22) Filed: Apr. 14, 2015

(65) Prior Publication Data

US 2015/0222103 A1  Aug. 6, 2015

Related U.S. Application Data

(63) Continuation of application No. PCT/JP2013/078358, filed on Oct. 18, 2013.

(30) Foreign Application Priority Data

Oct. 18, 2012  (JP) .................................. 2012-231019

(51) Int. Cl.
 *H02G 3/04*  (2006.01)
 *B60R 16/02*  (2006.01)
 (Continued)

(52) U.S. Cl.
 CPC ....... *H02G 3/0418* (2013.01); *B60R 16/0215* (2013.01); *H02G 3/0481* (2013.01);
 (Continued)

(58) Field of Classification Search
 CPC .......... H02G 3/06; H02G 3/04; H02G 3/0418; H02G 3/0431; H02G 3/0462;
 (Continued)

(56) References Cited

U.S. PATENT DOCUMENTS 4,797,512 A * 1/1989 Kumagai ............... H02G 15/18
  174/72 A
4,970,351 A * 11/1990 Kirlin .................. H02G 3/0406
  174/72 A (Continued)

FOREIGN PATENT DOCUMENTS

CN  2596159 Y  12/2003
CN  1910394 A  2/2007
 (Continued)

OTHER PUBLICATIONS

International Preliminary Report on Patentability and English language Written Opinion of the International Search Report for PCT/JP2013/078358 dated Apr. 21, 2015.

(Continued)

*Primary Examiner* — Angel R Estrada
(74) *Attorney, Agent, or Firm* — Kenealy Vaidya LLP

(57) ABSTRACT

The wire harness exterior member is a tube-shaped wire harness exterior member which houses and protects at least one conductive path. The wire harness exterior member is formed by connecting metal pipes made of different materials.

7 Claims, 6 Drawing Sheets

(51) Int. Cl.
*H02G 3/06* (2006.01)
*H02G 3/32* (2006.01)

(52) U.S. Cl.
CPC ............. *H02G 3/0487* (2013.01); *H02G 3/06* (2013.01); *H02G 3/32* (2013.01)

(58) Field of Classification Search
CPC .. H02G 3/0481; H02G 3/0487; H02G 3/0691;
H02G 3/32; H02G 3/0406; H02G 3/0608;
H02G 3/0616; H01B 7/06; H01B 7/20;
H01B 7/202; H01B 7/00; F16L 13/02;
F16L 21/00; F16L 23/036; F16L 57/00;
F16L 23/006; B60R 16/0215; B60R 16/02
USPC ......... 174/72 A, 72 R, 74 R, 88 R, 70 C, 95, 174/68.1, 68.3; 138/111, 140, 141, 142; 285/238, 239, 242, 373
See application file for complete search history.

(56) References Cited

U.S. PATENT DOCUMENTS

| | | | |
|---|---|---|---|
| 6,717,055 B2* | 4/2004 | Kato | H02G 3/32 174/72 A |
| 7,038,133 B2* | 5/2006 | Arai | H02G 3/0487 174/72 A |
| 7,119,275 B2* | 10/2006 | Suzuki | H02G 3/0691 174/68.1 |
| 8,944,474 B2* | 2/2015 | Serizawa | H02G 3/0691 285/373 |
| 2005/0011687 A1 | 1/2005 | Yamaguchi et al. | |
| 2006/0192385 A1 | 8/2006 | Hiernard et al. | |
| 2012/0305308 A1 | 12/2012 | Toyama et al. | |
| 2013/0299234 A1 | 11/2013 | Izawa et al. | |

FOREIGN PATENT DOCUMENTS

| | | |
|---|---|---|
| JP | 2-142684 A | 5/1990 |
| JP | 2004-224156 A | 8/2004 |
| JP | 2011-165354 A | 8/2011 |
| JP | 2012-178315 A | 9/2012 |

OTHER PUBLICATIONS

International Search Report and Written Opinion of the International Search Report for PCT/JP2013/078358 dated Dec. 3, 2013.
Japanese Office Action for the related Japanese Patent Application No. 2012-231019 dated Jan. 26, 2016.
Japanese Office Action for the related Japanese Patent Application No. 2012-231019 dated Jul. 12, 2016.
Chinese Office Action for the related Chinese Patent Application No. 201380054536.5 dated Jul. 20, 2016.
Chinese Office Action for the related Chinese Patent Application No. 201380054536.5 dated Dec. 7, 2016.

* cited by examiner

WIRE HARNESS EXTERIOR MEMBER AND WIRE HARNESS

CROSS REFERENCE TO RELATED APPLICATION(S)

This application is a continuation of PCT application No. PCT/JP2013/078358, which was filed on Oct. 18, 2013 based on Japanese Patent Application (No. 2012-231019) filed on Oct. 18, 2012, the contents of which are incorporated herein by reference.

BACKGROUND OF THE INVENTION

1. Field of the Invention

The present invention relates to a wire harness exterior member and a wire harness including the exterior member.

2. Description of the Related Art

In a hybrid car or an electric car, electric connection is established, for example, between a battery and an inverter unit or between the inverter unit and a motor unit by a high voltage (i.e. for high voltage application) wire harness. A wire harness disclosed in JP-A-2004-224156 includes a high voltage electric wire serving as a high voltage conductive path, and an exterior member made of metal and storing the high voltage electric wire.

SUMMARY OF THE INVENTION

In the above-described background-art technique, heat generated in the high voltage electric wire may be accumulated in an electric wire housing space of the exterior member. In this case, due to the accumulated heat, there is a fear that the temperature of the high voltage electric wire cannot fall down easily. As a measure against this problem, it is considered to increase the heat resistant temperature of the high voltage electric wire. However, this measure is not always effective. It is therefore considered to use an exterior member high in heat radiation. However, when an exterior member high in heat radiation is used, heat radiation may be enhanced even in a part whose heat radiation does not have to be enhanced. Thus, the cost may increase.

A point to be improved in terms of heat has been described above, but points to be improved are not limited thereto. Similar points to be improved also arise in terms of shock resistance, corrosion resistance, etc.

The present invention has been made in consideration of the above-described circumstances, and an object thereof is to provide a wire harness exterior member capable of making use of properties of materials in accordance with parts to which the materials are disposed, and a wire harness including the exterior member as its constituent.

In order to accomplish the object, a wire harness exterior member and a wire harness of the present invention is characterized by items (1)-(3) as follows:

(1) A tube-shaped wire harness exterior member which houses and protects at least one conductive path, wherein the wire harness exterior member is formed by connecting metal pipes made of different materials.

(2) The exterior member according to (1), wherein the metal pipes are connected: by welding; by fastening flanges formed in the metal pipes to each other by a fastening member; or using a coupling member.

(3) A wire harness including: the wire harness exterior member according to (1) or (2); and at least one conductive path housed and protected by the wire harness exterior member.

The wire harness exterior member according to the above-described paragraph (1) is formed by connecting metal pipes made of different materials so that properties of the materials can be used in accordance with parts to which the materials are disposed. In addition, the exterior member in which the metal pipes have not yet been connected can be stored so compactly as to contribute to space saving.

In the wire harness exterior member according to the above-described paragraph (2), the metal pipes can be connected to each other by welding or fastening or through a coupling member in consideration of properties of materials thereof.

The wire harness exterior member according to the above-described paragraph (3) includes the wire harness exterior member according to the above-described paragraph (1) or (2). It is therefore possible to provide a wire harness capable of making use of properties of materials in accordance with parts to which the materials are disposed.

DETAILED DESCRIPTION OF THE EXEMPLARY EMBODIMENTS

In this embodiment, metal pipes different in material are connected to form a wire harness exterior member. At least one conductive path is housed and protected in the wire harness exterior member. Thus, a wire harness is formed.

Figure 1:
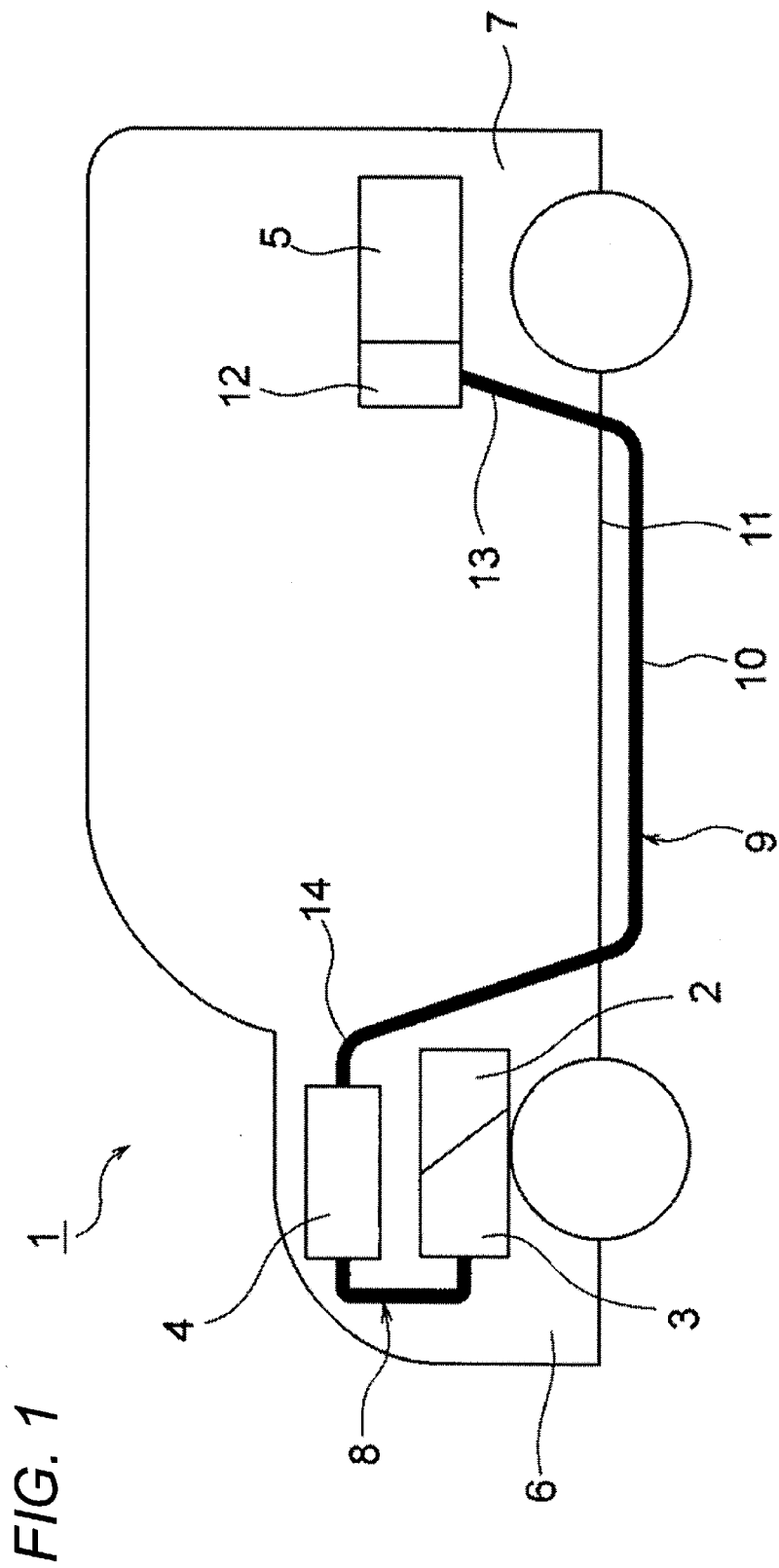
FIG. 1 is a schematic view showing a state in which a wire harness is wired.
Figure 2:
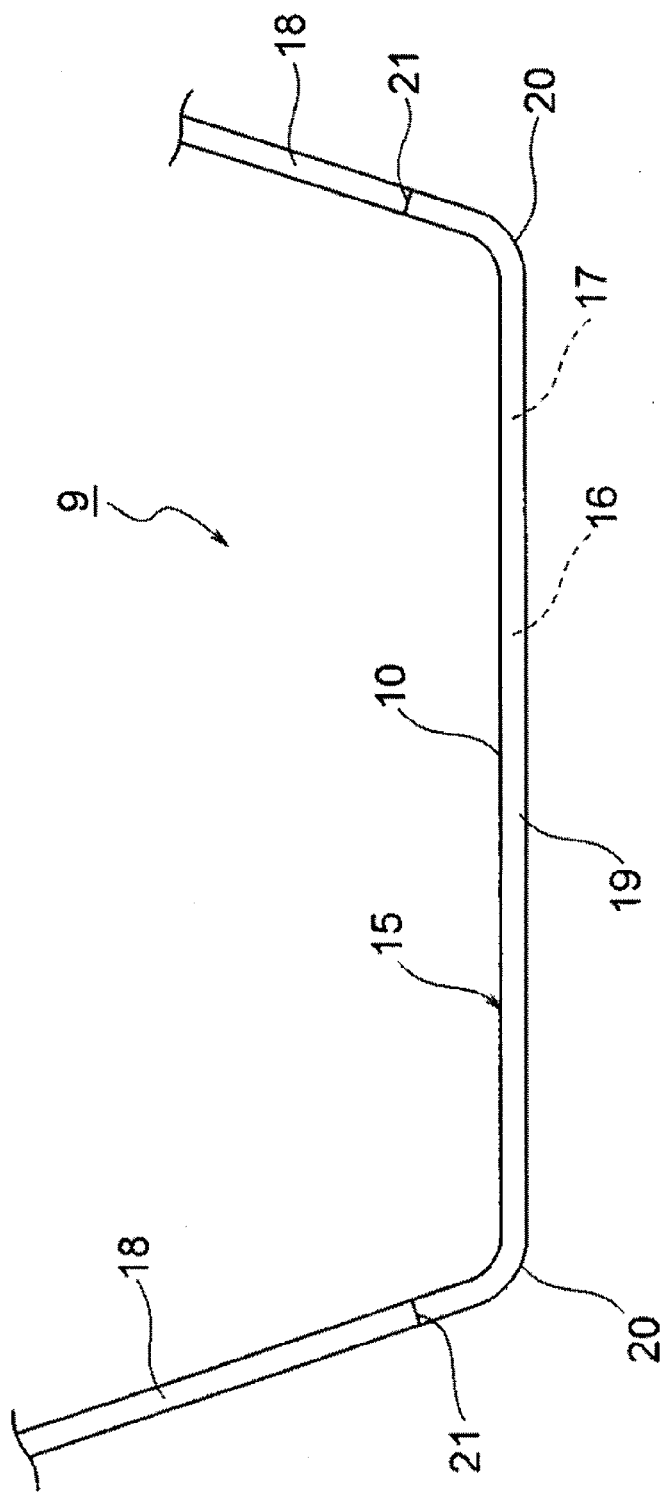
FIG. 2 is a schematic view of an exterior member.
Figure 4:
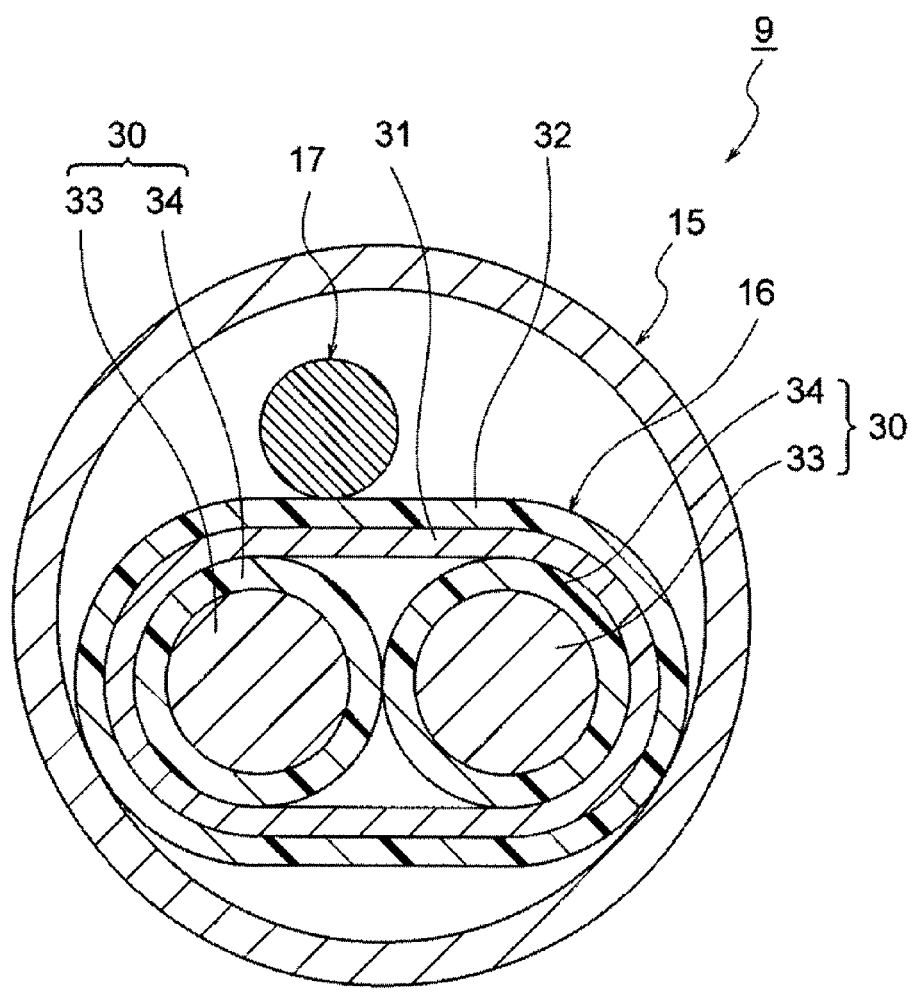
FIG. 4 is a sectional view showing the configuration of a high voltage conductive path.
Figure 5:
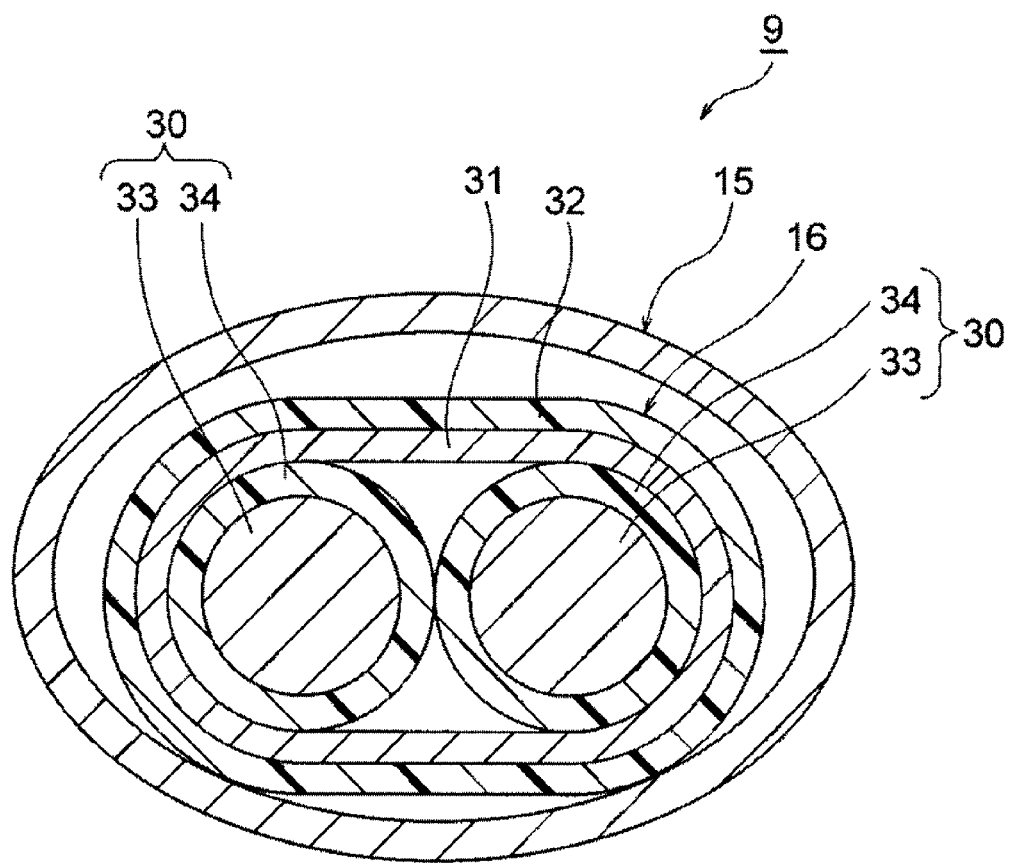
FIG. 5 is a sectional view showing a modification of the exterior member.
Figure 6:
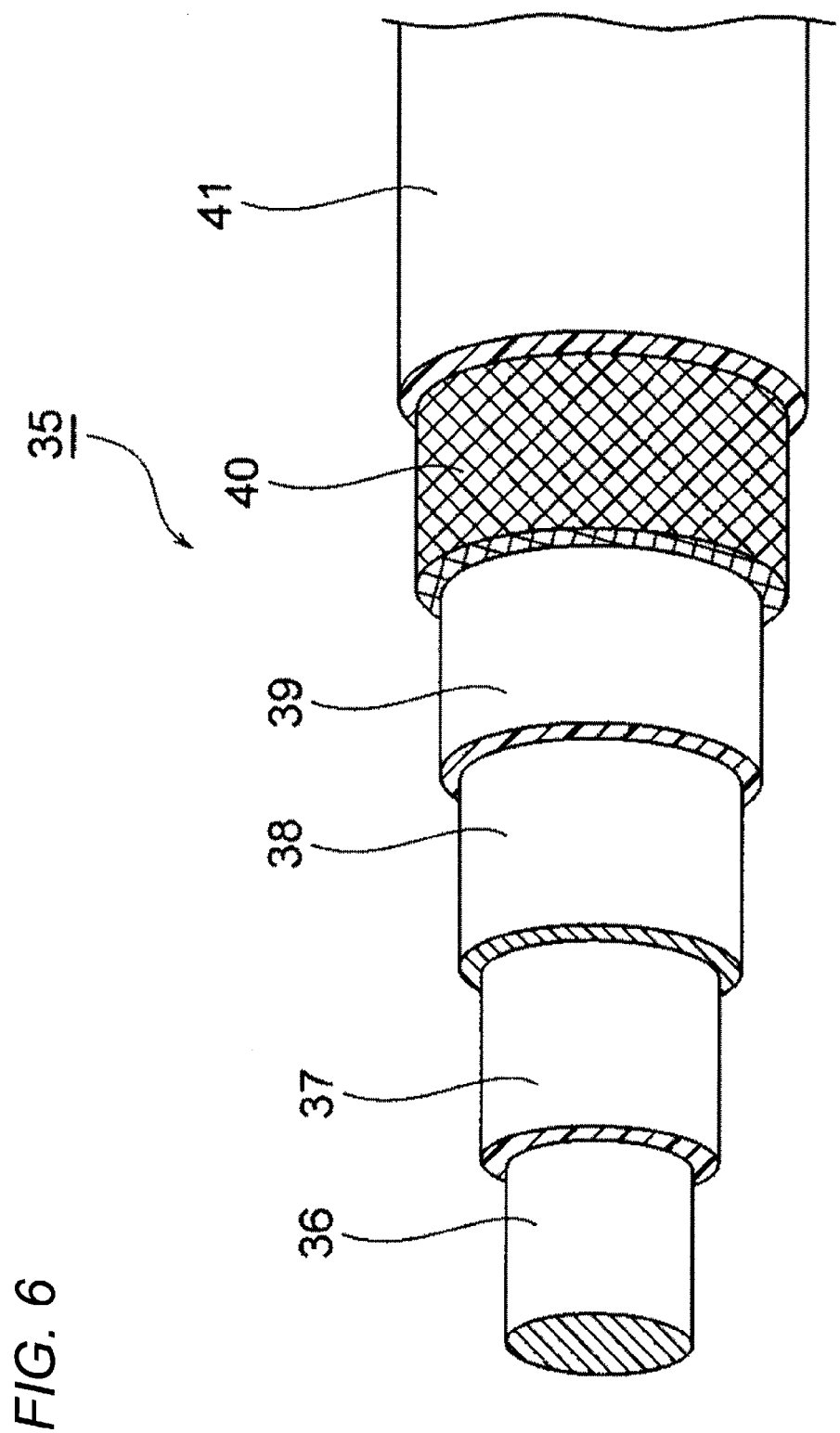
FIG. 6 is a view showing the configuration of a high voltage coaxial composite conductive path.

The wire harness exterior member and the wire harness according to the embodiment will be described below with reference to FIG. 1 to FIG. 6. FIG. 1 is a schematic view showing a state in which the wire harness is wired. FIG. 2 is a schematic view of the exterior member. FIG. 3A to FIG. 3D are views showing states in which the metal pipes are connected. FIG. 4 is a sectional view showing the configuration of a high voltage conductive path. FIG. 5 is a sectional view showing a modification of the exterior member. FIG. 6 is a view showing the configuration of a high voltage coaxial composite conductive path.

In the embodiment, description will be made along an example in which the invention is applied to a wire harness to be wired in a hybrid car (which may be replaced by an electric car or a general car).

In FIG. 1, the reference numeral 1 represents a hybrid car. The hybrid car 1 is a vehicle which is driven by a mixture of two power sources, that is, an engine 2 and a motor unit 3. To the motor unit 3, electric power is supplied from a battery 5 (or a battery pack) through an inverter unit 4. In this example, the engine 2, the motor unit 3 and the inverter unit 4 are mounted in an engine room 6 close to front wheels etc. On the other hand, the battery 5 is mounted in a car rear portion 7 close to rear wheels etc. Incidentally, the battery 5 may be mounted in a car cabin that is located at the rear of the engine room 6.

The motor unit 3 and the inverter unit 4 are electrically connected through a high voltage wire harness 8. In addition, the battery 5 and the inverter unit 4 are also electrically connected through a high voltage wire harness 9. An intermediate portion 10 of the wire harness 9 is wired in an vehicle underfloor 11. In addition, the wire harness 9 is wired substantially in parallel with the vehicle underfloor 11. The vehicle underfloor 11 is a well-known body that is a so-called panel member. Through holes (not shown) are formed in predetermined positions of the vehicle underfloor 11. The wire harness 9 is inserted into the through holes.

The wire harness 9 and the battery 5 are electrically connected through a junction block 12 that is provided in the battery 5. A rear end 13 of the wire harness 9 is electrically connected to the junction block 12 by a well-known method. On the other hand, a front end 14 of the wire harness 9 is electrically connected to the inverter unit 4 by a well-known method.

The motor unit 3 has a motor (not shown) and a generator (not shown). On the other hand, the inverter unit 4 has an inverter (not shown) and a converter (not shown). The motor unit 3 is formed as a motor assembly including a shield case (not shown). The inverter unit 4 is also formed as an inverter assembly including a shield case (not shown). The battery 5 is a modularized one based on Ni-MH or Li-ion. For example, an electric storage device such as a capacitor may be used. The battery 5 is not limited especially as long as it can be used in the hybrid car 1 or an electric car.

The configuration and structure of the wire harness 9 will be described below.

In FIG. 2, the wire harness 9 includes an exterior member 15 (that is, a wire harness exterior member), a high voltage conductive path 16 (that is, a conductive path. See FIG. 4.) that is inserted into the exterior member 15, and a low voltage conductive path 17 (that is, a conductive path. See FIG. 4.) that is also inserted into the exterior member 15 and arranged along the high voltage conductive path 16. The wire harness 9 is attached to the vehicle underfloor 11 (see FIG. 1) or the like through not-shown clamps (or clamps 27 that will be described later).

The exterior member 15 is a tube body made of metal and covering the high voltage conductive path 16 and the lower voltage conductive path 17 to thereby protect them. The exterior member 15 is formed into a sectionally circular shape in the embodiment. Incidentally, the above-described sectional shape of the exterior member 15 is exemplary, but it may be an elliptic shape, an oval shape, a rectangular shape, or the like.

The exterior member 15 is formed to be long in accordance with a path in which the wire harness 9 is wired. In addition, the exterior member 15 is formed to be thick enough to protect the high voltage conductive path 16 and the lower voltage conductive path 17. Further, the exterior member 15 is formed into a diameter large enough to keep the high voltage conductive path 16 and the lower voltage conductive path 17 inserted thereto and housed therein.

Since the exterior member 15 houses the high voltage conductive path 16, the exterior member 15 includes, in its external surface, a part that can be recognized as high voltage. In this embodiment, the part is painted in orange color indicating high voltage. Incidentally, the part that can be recognized as high voltage may be not always painted in orange color but taped with, for example, an orange tape or the like.

The exterior member 15 is formed by connecting metal pipes 18 and 19 made of different materials. Due to the connection of the metal pipes 18 and 19 different in material, the exterior member 15 is formed to include a plurality of parts making use of properties of the materials.

The metal pipes 18 are formed out of a metal material high in thermal conductivity or a metal material high in heat radiation. By use of the metal material high in heat radiation, the metal pipes 18 can release heat generated in the high voltage conductive path 16 to the outside. Incidentally, examples of metal high in heat radiation may include copper, aluminum, and alloys of them. In the embodiment, copper higher in thermal conductivity than aluminum is used as the material of the metal pipes 18. The metal pipes 18 are connected to the opposite terminals of the metal pipe 19 and with predetermined lengths respectively.

The metal pipe 19 is formed out of a metal material having shock resistance or strength. By use of the metal material having shock resistance or strength, the metal pipe 19 can effectively protect the high voltage conductive path 16 inside the metal pipe 19, for example, from underfloor chipping or running over a curb stone. In the embodiment, aluminum different from the material of the metal pipes 18 is used. Incidentally, aluminum is exemplary but another metal material may be used as the material of the metal pipes 18.

The reference numeral 20 in the metal pipe 19 represents a bent portion. For example, the metal pipe 19 is bent by a not-shown bender machine so as to form each bent portion 20. The metal pipe 19 has a good workability because it is made of aluminum. It is easy to form the bent portions 20.

Although not shown in the embodiment, it is also effective to use a metal material having corrosion resistance for a part to which water will splash in the exterior member 15. It is also effective to coat the external surface of the exterior member 15 with resin.

Although not shown especially, post-fitting parts are attached to the exterior member 15 configured thus. Examples of the post-fitting parts may include clamps for attaching the wire harness 9 to the vehicle underfloor 11 (see FIG. 1), grommets to be water-tightly attached to through holes formed in the vehicle underfloor 11, etc.

In FIG. 3A to FIG. 3D, how to connect the metal pipes 18 and 19 is not limited especially, but some manners can be shown as follows.

Figure 3A:
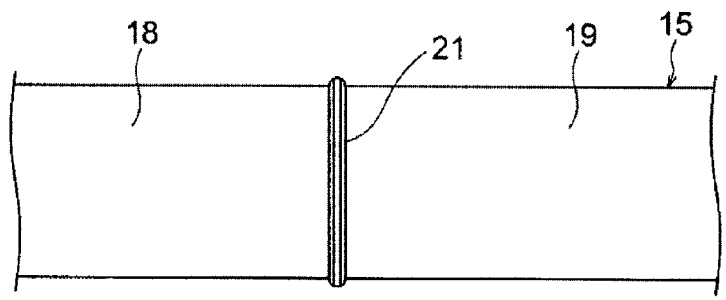
FIG. 3A to FIG. 3D are views showing states in which metal pipes are connected.
Figure 3B:
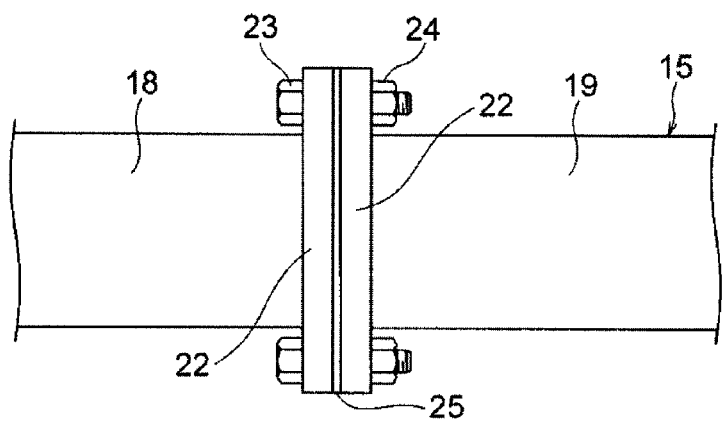

First, the manner shown in FIG. 3A is a manner in which the metal pipes 18 and 19 are connected by welding 21. Brazing or the like may be used in place of the welding 21. Next, the manner shown in FIG. 3B is a manner in which flanges 22 are formed in the vicinities of terminals of the metal pipes 18 and 19, and the flanges 22 are fastened to each other by bolts 23 and nuts 24 as fastening members to thereby connect the metal pipes 18 and 19. Incidentally, the fastening by the bolts 23 and the nuts 24 is exemplary but the flanges 22 may be fastened to each other using other fastening members such as rivets. Incidentally, in FIG. 3B, the reference numeral 25 represents a packing.

Figure 3C:
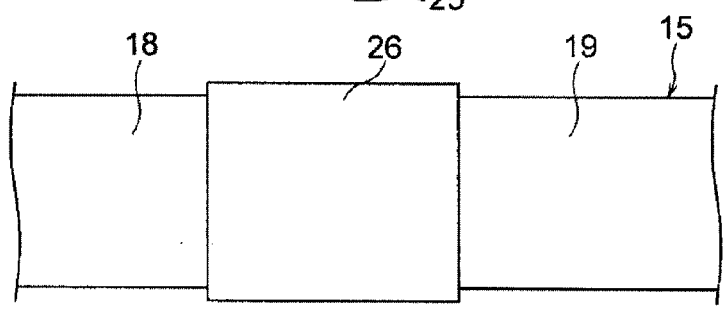

Next, the manner shown in FIG. 3C is a manner in which the metal pipes 18 and 19 are connected using a coupling member 26. Incidentally, any member may be used as the coupling member 26 if it can connect the metal pipes 18 and 19 with each other. Examples of the coupling member 26 may include a cylindrical member with rigidity, and a member made of a resin material curable by water, heat, ultraviolet rays, etc.

Figure 3D:
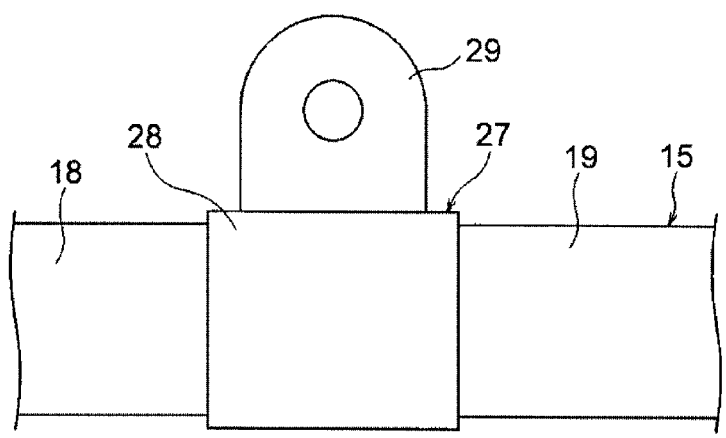

Next, the manner shown in FIG. 3D is a manner in which the metal pipes 18 and 19 are connected using a clamp 27. The clamp 27 has a cylindrical pipe attachment portion 28 that will be attached to a part where the metal pipes 18 and 19 should be connected to each other, and a fixation portion 29 that will be fixed to a fixation target such as a vehicle body by a not-shown bolt. The pipe attachment portion 28 has rigidity high enough to connect the metal pipes 18 and 19 with each other. That is, in the case of FIG. 3D, the clamp 27 as a post-fitting part serves as a coupling member for connecting the metal pipes 18 and 19.

In FIG. 4, the high voltage conductive path 16 has two high voltage circuits 30, a shield member 31 the two high voltage circuits 30 are covered with, and a sheath 32 (or an insulating member) that is provided outside the shield member 31. Incidentally, this configuration is exemplary.

Each high voltage circuit 30 is a well-known high voltage electric wire, which includes a conductor 33 and an insulator 34 the conductor 33 is covered with. The high voltage circuit 30 is formed into a required length for electric connection. The high voltage circuit 30 is formed to be long because the wire harness 9 makes electric connection between the inverter unit 4 and the battery 5 (specifically the junction block 12) as shown in FIG. 1.

The conductor 33 is manufactured out of copper, a copper alloy, aluminum or an aluminum alloy. The conductor 33 may have a conductor structure that consists of twisted strands or a rod-like conductor structure that is rectangular or circular in section (for example, a conductor structure that serves as a rectangular single core or a circular single core. In this case, the electric wire itself also has a rod-like shape). On the external surface of the conductor 33 configured thus, the insulator 34 made of an insulating resin material is formed by extrusion molding.

Incidentally, the configuration of a well-known high voltage electric wire is, though not limited thereto, used as the high voltage circuit 30 in the embodiment. That is, a high voltage circuit in which an insulator is provided in the outer circumference of a well-known bus bar, or the like, may be used as the high voltage circuit 30.

The shield member 31 is an electromagnetic shield member (that is, an anti-electromagnetic wave shield member) the two high voltage circuits 30 are collectively covered with. A well-known braid that consists of a large number of strands braided into a cylindrical shape is used as the shield member 31. The shield member 31 is formed to be substantially as long as the whole length of the two high voltage circuits 30. An end portion of the shield member 31 is electrically connected to a shield case or the like of the inverter unit 4 (see FIG. 1) through a not-shown high voltage side connection portion.

As the shield member 31, for example, metal foil having electric conductivity or a member including the metal foil may be used as long as it can take a measure against electromagnetic waves.

The sheath 32 is formed by extrusion molding out of an insulating resin material into a predetermined thickness on the outer side of the shield member 31. The sheath 32 is disposed in a position corresponding to an outermost layer of the high voltage conductive path 16. The sheath 32 is subjected to terminal processing during the manufacturing of the wire harness 9 so that the shield member 31 can be exposed with a predetermined length. Incidentally, the sheath 32 that has been subjected to the terminal processing is slightly longer than the exterior member 15.

The above-described not-shown high voltage side connection portion is an electric connection part that is provided at a terminal of the high voltage conductive path 16 having the above-described configuration. A well-known shield connector or the like corresponds to the not-shown high voltage side connection portion. As long as the high voltage conductive path 16 can be electrically connected to the inverter unit 4 or the like, the configuration and structure of the high voltage side connection portion are not limited especially. Another example than the shield connector may include a configuration consisting of a conductive shield shell and a caulking ring to which an end portion of the shield member 31 is connected and fixed, and terminal fittings that are provided at terminals of the two high voltage circuits 30 penetrating the shield shell.

The low voltage conductive path 17 is a well-known electric wire that consists of a conductor and an insulator. The low voltage conductive path 17 is used as a signal line in the embodiment. The low voltage conductive path 17 has a configuration as a non-shielded electric wire. A not-shown low voltage side connection portion that is a well-known connector is provided at a terminal of the low voltage conductive path 17. The low voltage side connection portion has an insulating housing and a not-shown terminal fitting that is received and fixed in a terminal housing chamber of the housing. The terminal fitting is electrically connected to the low voltage conductive path 17 by crimping or pressure contact.

Incidentally, it is optional whether to include the low voltage conductive path 17 in the configuration of the wire harness 9 or not.

The exterior member 15 may be formed into a sectionally elliptic shape as shown in FIG. 5. In this case, the height can be reduced in comparison with that in FIG. 4. It is therefore possible to reduce the height of the wire harness 9.

In place of the high voltage conductive path 16, the wire harness 9 may use a high voltage coaxial composite conductive path 35 as shown in FIG. 6. The high voltage coaxial composite conductive path 35 includes a plus circuit and a minus circuit by itself. That is, the high voltage coaxial composite conductive path 35 includes circuits of two systems. Specifically, the high voltage coaxial composite conductive path 35 has a first conductive path 36, a first insulator 37, a second conductive path 38, a second insulator 39, a shield member 40 and a sheath 41. The first conductive path 36 is circular in section and is located at the center of the high voltage coaxial composite conductive path 35. The first insulator 37 covers the outer circumference of the first conductive path 36 with a predetermined thickness. The second conductive path 38 is provided on the outer side of the first insulator 37. The second insulator 39 covers the outer circumference of the second conductive path 38 with a predetermined thickness. The shield member 40 is cylindrical and in close contact with the outer surface of the second insulator 39. The sheath 41 covers the outer circumference of the shield member 40 with a predetermined thickness.

Although the high voltage coaxial composite conductive path 35 has two systems in the example shown in FIG. 6, the high voltage coaxial composite conductive path 35 is not limited thereto. The high voltage coaxial composite conductive path 35 may have three systems . . . , or n systems. That is, the high voltage coaxial composite conductive path 35 can have n systems if circuits are added outward to keep the configuration as a single coaxial path.

As has been described above with reference to FIG. 1 to FIG. 6, the wire harness 9 includes the exterior member 15 and the high voltage conductive path 16 inserted into the exterior member 15. Since the exterior member 15 is formed by connecting the metal pipes 18 and 19 made of different materials, the properties of the materials can be used in accordance with parts to which the materials are disposed. For example, in the embodiment, heat radiation can be enhanced by the metal pipes 18, and shock resistance can be enhanced by the metal pipe 19.

The wire harness exterior member and the wire harness according to the embodiment will be summarized below.

(1) The exterior member 15 (wire harness exterior member) according to the embodiment is a tube-shaped wire harness exterior member which houses and protects at least one conductive path (the high voltage conductive path 16 and the low voltage conductive path 17). The exterior member 15 is formed by connecting the metal pipes 18 and 19 made of different materials.

(2) In the exterior member 15 according to the embodiment, the metal pipes 18 and 19 are connected by the welding 21. Alternatively, the metal pipes 18 and 19 are connected by fastening the flanges 22 formed in the metal pipes 18 and 19 to each other by a fastening member (bolts 23). Alternatively, the metal pipes 18 and 19 are connected using the coupling member 26 (clamp 27).

(3) The wire harness 9 according to the embodiment includes: the exterior member 15 (wire harness exterior member) according to the above-described paragraph (1) or (2); and at least one conductive path (the high voltage conductive path 16 and the low voltage conductive path 17) that is housed and protected by the exterior member 15.

It is a matter of course that various changes can be made on the invention without changing the gist of the invention.

A wire harness exterior member and a wire harness according to the invention are useful because it is possible to provide a wire harness exterior member capable of making use of properties of materials in accordance with parts to which the materials are disposed, and a wire harness including the exterior member as its constituent.

What is claimed is:

1. A tube-shaped wire harness exterior member which houses and protects at least one conductive path, comprising:
   wherein the wire harness exterior member is formed by connecting metal pipes made of different materials,
   wherein at least one of the metal pipes is formed from aluminum, and the at least one of the metal pipes includes a bent portion,
   wherein a metal material having corrosion resistance is used for at least a part of the wire harness exterior member, and
   wherein each of the metal pipes spans a length and has a cross-sectional dimension that is substantially constant along the length.

2. The exterior member according to claim 1,
   wherein the metal pipes are connected:
   by welding;
   by fastening flanges formed in the metal pipes to each other by a fastening member; or
   using a coupling member.

3. A wire harness comprising:
   the wire harness exterior member according to claim 1; and
   at least one conductive path housed and protected by the wire harness exterior member.

4. The exterior member according to claim 1, wherein another one of the metal pipes is formed from a metal material that is different from the aluminum of the at least one metal pipe.

5. The exterior member according to claim 1, wherein another one of the metal pipes is formed from aluminum that is different from the aluminum of the at least one of the metal pipes.

6. The exterior member according to claim 1, wherein the aluminum of the at least one of the metal pipes has shock resistance and strength.

7. The exterior member according to claim 1, wherein another one of the metal pipes is formed of a metal material that is high in thermal conductivity.

* * * * *